March 17, 1953  H. J. HUTTER  2,631,452

WHEEL BALANCE INDICATING DEVICE

Filed Feb. 24, 1950

INVENTOR
*Harry J. Hutter*
BY *Evans + McCoy*
ATTORNEYS

Patented Mar. 17, 1953

2,631,452

UNITED STATES PATENT OFFICE 2,631,452

WHEEL BALANCE INDICATING DEVICE

Harry J. Hutter, Euclid, Ohio

Application February 24, 1950, Serial No. 146,044

1 Claim. (Cl. 73—66)

This invention relates to wheel balance indicating devices and particularly to a balance indicating device for use in balancing automobile wheels to avoid shimmying and excessive tire wear.

The invention has for an object to provide a simple, compact and portable device of rugged construction which can be manufactured at a relatively low cost and which is convenient to use.

It is also an object of the invention to provide a tire balancer that is readily adaptable to wheels varying considerably in size.

A further object of the invention is to provide a balance indicating device that is provided with a rigid universally fulcrumed balancing table provided with an integral wheel support and with a yieldably mounted centering device that acts to automatically center the wheel while it is being lowered onto the table.

With the above and other objects in view, the invention may be said to comprise the balance indicating device as illustrated in the accompanying drawings and hereinafter described, together with such variations and modifications thereof as will be apparent to one skilled in the art to which the invention pertains.

Reference should be had to the accompanying drawings forming a part of this specification in which.

Figure 1:
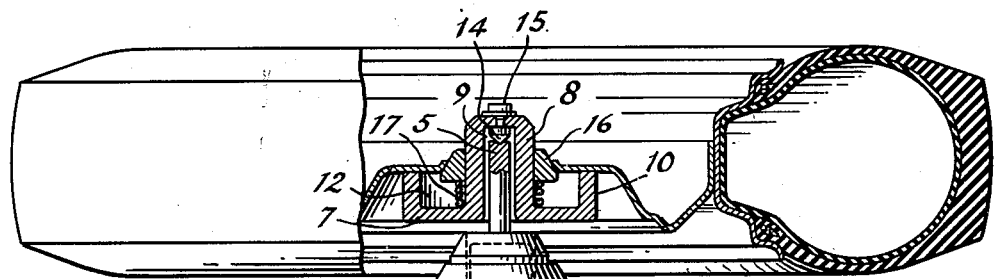
Figure 1 is a side elevation of a balance indicating device embodying the invention, with an automobile wheel mounted thereon, a portion of the wheel and balancing table being broken away and shown in section.
Figure 2:
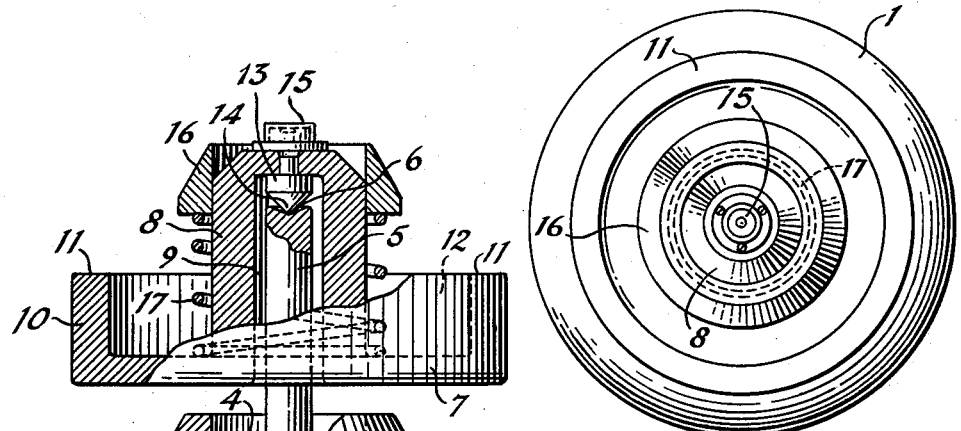
Fig. 2 is a plan view of the device on an enlarged scale.
Figure 2:
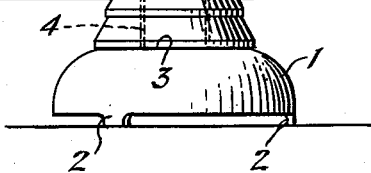
Figure 3:
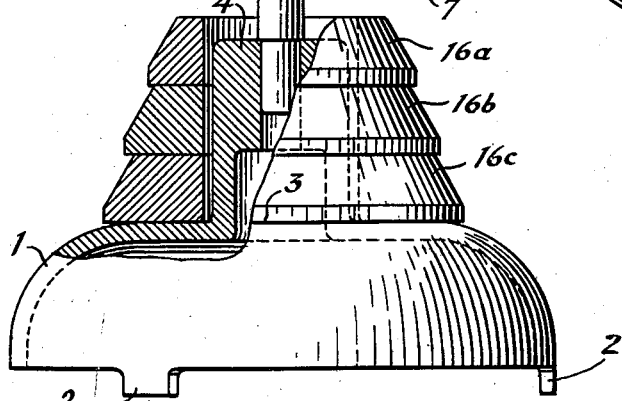
Fig. 3 is a side elevation of the balance indicating device on a larger scale than in either Fig. 1 or Fig. 2, a portion being broken away to show the centering collars supported on the base and another portion being broken away to show part of the balancing table in section.

The balancing device herein shown is provided with a base 1 in the form of an inverted cup-shaped casting having a circular rim from which short circumferentially spaced legs 2 project. The base 1 has a flat top portion 3 and centrally of the top portion 3 there is a short upwardly projecting column 4. A vertical hardened steel fulcrum post 5 is attached to the end column 4 centrally thereof and is provided with a substantially conical recess 6 in its upper end.

The post 5 serves to support a balancing table 7. The table 7 is provided with a central upright column 8 and with an axial post receiving recess 9 that extends upwardly from the bottom of the table to adjacent the top of the column 8. The bottom portion of the table 7 is substantially flat and extends outwardly from the column 8, the periphery of the table being provided with a cylindrical upstanding flange 10 the top edge of which forms a wheel supporting ledge 11 concentric with the column 8. The flange 10 is spaced radially outwardly from the column 8 to provide an annular recess 12 between the flange and column.

Within the recess 9 at the upper end thereof a bearing member 13 is attached to the column 8 and this bearing member has a conical point 14 coaxial with the column and engageable in the recess 6 in the top of the post to provide a universal fulcrum for the balancing table. The recess 9 is of a diameter somewhat greater than that of the post 5 to allow some tilting movement of the table 7, and the table 7 can be readily lifted off the post 5 and replaced upon the post 5, the point 14 of the bearing member being guided to the center of the recess 6 by the substantially conical wall of the recess.

A suitable level 15 is mounted upon the top of the column 8 coaxially with the table, the bearing point 14 and the axis of the level 15 being in vertical alinement with the center of gravity of the table 7, to indicate the horizontal position of the table.

Means is provided for automatically centering the wheel as it is being lowered onto the table and, to accommodate wheels with center openings that vary considerably in diameter, a series of pick-off centering collars 16, 16a, 16b and 16c of different external diameters are provided, and these collars are provided with openings of the same size which have a sliding fit upon the column 8 of the table and may be stored upon the column 4 of the base which is of a size to receive the collars.

The centering collars 16, 16a, 16b and 16c have upwardly tapering peripheries which may be conical in form for engagement with the rim of the wheel opening and, when any one of the centering collars is placed on the column 8, it is yieldably supported upon a suitable spring such as a helical coil spring 17 that surrounds the column 8 and rests upon the bottom portion of the table 7.

The annular recess 12 of the table is of a radial dimension sufficient to receive any one of the centering collars and the coil spring 17 normally supports the centering collar with its tapering wheel engaging portion above the wheel supporting ledge 11. When the wheel is placed upon the centering collar the rim of its axial opening engages with the conical surface of the collar and the wheel is shifted to a position coaxial with the table. The weight of the wheel imposed upon the centering collar compresses the spring 17 and moves the collar downwardly into the recess 12 so that a portion of the wheel body surrounding its axial opening is brought to rest upon the supporting ledge 11. The strength of the spring 17 is preferably such as to support a substantial portion of the weight of the wheel so that the wheel will be lowered gently upon the ledge 11, the wheel being centered by engagement with the conical collar and being leveled with respect to the table by engagement with the ledge 11. Each of the centering collars is slidable on or off the upper end of either of the columns 4 or 8, and to change centering collars to accommodate a wheel of different size the table 7 is lifted off the post 5 and the desired centering collar is taken from the column 4 and placed upon the column 8, after which the table may be replaced upon the post 5.

The spring 17 is also readily removable since it can be lifted off the table when a centering collar is removed from the column, so that the spring can be readily replaced with another spring of greater or less strength when desired.

While the wheel is supported upon the balancing table 7 it may be balanced by applying suitable weights to peripheral portions thereof.

It is to be understood that in accordance with the provisions of the patent statutes, variations and modifications of the specific devices herein shown and described may be made without departing from the spirit of the invention.

What I claim is:

A wheel balancer comprising a base member having a top portion in the form of an upright cylindrical column, a fulcrum post secured to said column and projecting upwardly therefrom, a balancing table having a central cylindrical column of substantially the same diameter as the base column and an annular wheel supporting ledge below the top of the column surrounding the column concentric therewith and integrally connected to the column, said table having a post receiving recess extending upwardly into said column, a bearing member carried by the table at the upper end of said recess, said member resting upon the top of the post and providing a universal fulcrum for said table, a series of interchangeable upwardly tapering wheel centering pick off collars of different external diameter, each having an opening of a size to slidably receive either of said columns whereby it is slidable onto or off from either column, a plurality of said collars being mounted on said base column and one of said collars being mounted on said table column, and a helical coil spring surrounding the table column to yieldingly support the collar mounted thereon.

HARRY J. HUTTER.

REFERENCES CITED

The following references are of record in the file of this patent:

UNITED STATES PATENTS

| Number | Name | Date |
|---|---|---|
| 1,091,708 | Riddell | Mar. 31, 1914 |
| 1,352,905 | Machrol | Sept. 14, 1920 |
| 1,524,041 | Leighton | Jan. 27, 1925 |
| 2,502,633 | Shepard | Apr. 4, 1950 |
| 2,506,002 | Tinkham | May 2, 1950 |

FOREIGN PATENTS

| Number | Country | Date |
|---|---|---|
| 171,986 | Great Britain | Nov. 3, 1921 |